ns011210350B2

United States Patent
Elkherj et al.

(10) Patent No.: US 11,210,350 B2
(45) Date of Patent: *Dec. 28, 2021

(54) AUTOMATED ASSISTANCE FOR GENERATING RELEVANT AND VALUABLE SEARCH RESULTS FOR AN ENTITY OF INTEREST

(71) Applicant: Palantir Technologies Inc., Palo Alto, CA (US)

(72) Inventors: Matthew Elkherj, Palo Alto, CA (US); Ashley Einspahr, Palo Alto, CA (US); Breanna Bunge, San Bruno, CA (US); Chris Hammett, Washington, DC (US); Erika Crawford Tom, New York, NY (US); Mitchell Beard, Falls Church, VA (US); Ryan Beiermeister, San Francisco, CA (US); Seelig Sinton, Washington, DC (US); Sharon Hao, Redwood City, CA (US); William Ayers, Washington, DC (US); Seth Robinson, Brooklyn, NY (US)

(73) Assignee: Palantir Technologies Inc., Palo Alto, CA (US)

( * ) Notice: Subject to any disclaimer, the term of this patent is extended or adjusted under 35 U.S.C. 154(b) by 338 days.

This patent is subject to a terminal disclaimer.

(21) Appl. No.: 16/261,250

(22) Filed: Jan. 29, 2019

(65) Prior Publication Data
US 2019/0163709 A1 May 30, 2019

Related U.S. Application Data

(63) Continuation of application No. 15/584,423, filed on May 2, 2017, now Pat. No. 10,235,461.

(51) Int. Cl.
*G06F 16/951* (2019.01)
*G06F 16/38* (2019.01)

(52) U.S. Cl.
CPC ............ *G06F 16/951* (2019.01); *G06F 16/38* (2019.01)

(58) Field of Classification Search
None
See application file for complete search history.

(56) References Cited

U.S. PATENT DOCUMENTS 6,374,251 B1 4/2002 Fayyad et al.
6,567,936 B1 5/2003 Yang et al.
(Continued)

FOREIGN PATENT DOCUMENTS

EP 1191463 3/2002
EP 2555153 2/2013
(Continued)

OTHER PUBLICATIONS

US 8,712,906 B1, 04/2014, Sprague et al. (withdrawn)
(Continued)

*Primary Examiner* — Kim T Nguyen
(74) *Attorney, Agent, or Firm* — Sheppard Mullin Richter & Hampton LLP

(57) ABSTRACT

Systems and methods are provided for identifying relevant information for an entity, referred to as a seed entity. A plurality of search queries can be generated each comprising a property of a seed entity or one of the entities associated with the seed entity (seed-linked entities). Preferably, a collection of search queries includes ones representing different properties of the seed entity and properties of different seed-linked entities. Optionally, the collection of search queries is optimized to reduce search burden. Searches can then be conducted with the search queries in one or more data sources to obtain a plurality of search results, wherein each search result comprises a hit entity and one or more entities associated with the hit entity (hit-linked entity). For
(Continued)

each of the search results, a score can be determined taking as input (a) likelihood of match between the seed entity and the hit entity or between a seed-linked entity and a hit-linked entity, (b) presence of a new entity in the search result not present in the search queries or a difference between the new entity and an entity present in the search queries, and (c) characteristic of the new entity in the search result. Based on the scores, high priority search results can be presented a user for further analysis.

18 Claims, 5 Drawing Sheets

(56) References Cited

U.S. PATENT DOCUMENTS

| | | | |
|---|---|---|---|
| 6,775,675 B1 | 8/2004 | Nwabueze et al. | |
| 6,980,984 B1 | 12/2005 | Huffman et al. | |
| 7,373,669 B2 | 5/2008 | Eisen | |
| 7,451,397 B2 | 11/2008 | Weber et al. | |
| 7,574,409 B2 | 8/2009 | Patinkin | |
| 7,596,285 B2 | 9/2009 | Brown et al. | |
| 7,672,833 B2* | 3/2010 | Blume | G06Q 10/10 704/10 |
| 7,783,658 B1 | 8/2010 | Bayliss | |
| 7,805,457 B1 | 9/2010 | Viola et al. | |
| 7,814,102 B2 | 10/2010 | Miller et al. | |
| 7,996,210 B2* | 8/2011 | Godbole | G06F 40/35 704/9 |
| 8,046,362 B2 | 10/2011 | Bayliss | |
| 8,135,679 B2 | 3/2012 | Bayliss | |
| 8,135,719 B2 | 3/2012 | Bayliss | |
| 8,266,168 B2 | 9/2012 | Bayliss | |
| 8,301,904 B1 | 10/2012 | Gryaznov | |
| 8,312,546 B2 | 11/2012 | Aime | |
| 8,321,943 B1 | 11/2012 | Walters et al. | |
| 8,347,398 B1 | 1/2013 | Weber | |
| 8,447,674 B2 | 5/2013 | Choudhuri et al. | |
| 8,484,168 B2 | 7/2013 | Bayliss | |
| 8,495,077 B2 | 7/2013 | Bayliss | |
| 8,498,969 B2 | 7/2013 | Bayliss | |
| 8,515,739 B2* | 8/2013 | Godbole | G06F 40/10 704/9 |
| 8,554,653 B2 | 10/2013 | Falkenborg et al. | |
| 8,560,413 B1 | 10/2013 | Quarterman | |
| 8,566,327 B2* | 10/2013 | Carrico | G06Q 10/10 707/748 |
| 8,600,872 B1 | 12/2013 | Yan | |
| 8,682,812 B1 | 3/2014 | Ranjan | |
| 8,726,379 B1 | 5/2014 | Stiansen et al. | |
| 8,788,405 B1 | 7/2014 | Sprague et al. | |
| 8,788,407 B1 | 7/2014 | Singh et al. | |
| 8,818,892 B1 | 8/2014 | Sprague et al. | |
| 9,009,827 B1 | 4/2015 | Albertson et al. | |
| 9,043,894 B1 | 5/2015 | Dennison et al. | |
| 9,135,658 B2 | 9/2015 | Sprague et al. | |
| 9,165,299 B1 | 10/2015 | Stowe et al. | |
| 9,171,334 B1 | 10/2015 | Visbal et al. | |
| 9,177,344 B1 | 11/2015 | Singh et al. | |
| 9,202,249 B1 | 12/2015 | Cohen et al. | |
| 9,230,280 B1 | 1/2016 | Maag et al. | |
| 9,256,664 B2 | 2/2016 | Chakerian et al. | |
| 9,344,447 B2 | 5/2016 | Cohen et al. | |
| 9,367,872 B1 | 6/2016 | Visbal et al. | |
| 9,552,615 B2* | 1/2017 | Mathura | G06Q 50/26 |
| 2002/0194119 A1 | 12/2002 | Wright et al. | |
| 2003/0033228 A1 | 2/2003 | Bosworth-Davies et al. | |
| 2003/0074368 A1 | 4/2003 | Schuetze et al. | |
| 2003/0097330 A1 | 5/2003 | Hillmer et al. | |
| 2003/0154044 A1 | 8/2003 | Lundstedt et al. | |
| 2004/0205524 A1 | 10/2004 | Richter et al. | |
| 2005/0108063 A1 | 5/2005 | Madill et al. | |
| 2005/0222928 A1 | 10/2005 | Steier et al. | |
| 2006/0095521 A1 | 5/2006 | Patinkin | |
| 2006/0218637 A1 | 9/2006 | Thomas et al. |
| 2007/0106582 A1 | 5/2007 | Baker et al. |
| 2007/0192265 A1 | 8/2007 | Chopin et al. |
| 2007/0294200 A1 | 12/2007 | Au |
| 2008/0133567 A1 | 6/2008 | Ames et al. |
| 2008/0148398 A1 | 6/2008 | Mezack et al. |
| 2008/0228720 A1 | 9/2008 | Mukherjee et al. |
| 2008/0288425 A1 | 11/2008 | Posse et al. |
| 2009/0018940 A1 | 1/2009 | Wang et al. |
| 2009/0024505 A1 | 1/2009 | Patel et al. |
| 2009/0044279 A1 | 2/2009 | Crawford et al. |
| 2009/0082997 A1 | 3/2009 | Tokman et al. |
| 2009/0083184 A1 | 3/2009 | Eisen |
| 2009/0172821 A1 | 7/2009 | Daira et al. |
| 2009/0192957 A1 | 7/2009 | Subramanian et al. |
| 2009/0254970 A1 | 10/2009 | Agarwal et al. |
| 2009/0254971 A1 | 10/2009 | Herz |
| 2009/0271359 A1 | 10/2009 | Bayliss |
| 2009/0300589 A1 | 12/2009 | Watters et al. |
| 2009/0318775 A1 | 12/2009 | Michelson et al. |
| 2010/0077481 A1 | 3/2010 | Polyakov et al. |
| 2010/0077483 A1 | 3/2010 | Stolfo et al. |
| 2010/0100963 A1 | 4/2010 | Mahaffey |
| 2010/0106611 A1 | 4/2010 | Paulsen et al. |
| 2010/0125546 A1 | 5/2010 | Barrett et al. |
| 2010/0169237 A1 | 7/2010 | Howard et al. |
| 2010/0185691 A1 | 7/2010 | Irmak et al. |
| 2010/0306029 A1 | 12/2010 | Jolley |
| 2010/0330801 A1 | 12/2010 | Rouh |
| 2011/0055140 A1 | 3/2011 | Roychowdhury |
| 2011/0087519 A1 | 4/2011 | Fordyce, III et al. |
| 2011/0093327 A1 | 4/2011 | Fordyce, III et al. |
| 2011/0131122 A1 | 6/2011 | Griffin et al. |
| 2011/0167054 A1 | 7/2011 | Bailey et al. |
| 2011/0167493 A1 | 7/2011 | Song et al. |
| 2011/0173093 A1 | 7/2011 | Psota et al. |
| 2011/0178842 A1 | 7/2011 | Rane et al. |
| 2011/0219450 A1 | 9/2011 | McDougal et al. |
| 2011/0225650 A1 | 9/2011 | Margolies et al. |
| 2011/0231223 A1 | 9/2011 | Winters |
| 2011/0238510 A1 | 9/2011 | Rowen et al. |
| 2011/0238553 A1 | 9/2011 | Raj et al. |
| 2011/0238570 A1 | 9/2011 | Li et al. |
| 2011/0246229 A1 | 10/2011 | Pacha |
| 2011/0251951 A1 | 10/2011 | Kolkowitz |
| 2011/0307382 A1 | 12/2011 | Siegel et al. |
| 2011/0314546 A1 | 12/2011 | Aziz et al. |
| 2012/0004904 A1 | 1/2012 | Shin et al. |
| 2012/0084135 A1 | 4/2012 | Nissan et al. |
| 2012/0084866 A1 | 4/2012 | Stolfo |
| 2012/0131107 A1 | 5/2012 | Yost |
| 2012/0158626 A1 | 6/2012 | Zhu et al. |
| 2012/0215898 A1 | 8/2012 | Shah et al. |
| 2012/0254129 A1 | 10/2012 | Wheeler et al. |
| 2012/0310831 A1 | 12/2012 | Harris et al. |
| 2012/0310838 A1 | 12/2012 | Harris et al. |
| 2012/0311684 A1 | 12/2012 | Paulsen et al. |
| 2013/0006426 A1 | 1/2013 | Healey et al. |
| 2013/0006655 A1 | 1/2013 | Van Arkel et al. |
| 2013/0006668 A1 | 1/2013 | Van Arkel et al. |
| 2013/0018796 A1 | 1/2013 | Kolhatkar et al. |
| 2013/0024307 A1 | 1/2013 | Fuerstenberg et al. |
| 2013/0024339 A1 | 1/2013 | Choudhuri et al. |
| 2013/0151388 A1 | 6/2013 | Falkenborg et al. |
| 2013/0160120 A1 | 6/2013 | Malaviya et al. |
| 2013/0166550 A1 | 6/2013 | Buchmann et al. |
| 2013/0185320 A1 | 7/2013 | Iwasaki et al. |
| 2013/0197925 A1 | 8/2013 | Blue |
| 2013/0211985 A1 | 8/2013 | Clark et al. |
| 2013/0232045 A1 | 9/2013 | Tai et al. |
| 2013/0276799 A1 | 10/2013 | Davidson |
| 2013/0318594 A1 | 11/2013 | Hoy et al. |
| 2013/0339218 A1 | 12/2013 | Subramanian et al. |
| 2013/0339514 A1 | 12/2013 | Crank et al. |
| 2014/0006109 A1 | 1/2014 | Callioni et al. |
| 2014/0032506 A1 | 1/2014 | Hoey et al. |
| 2014/0058763 A1 | 2/2014 | Zizzamia et al. |
| 2014/0081652 A1 | 3/2014 | Klindworth |
| 2014/0129261 A1 | 5/2014 | Bothwell et al. |

(56) References Cited

U.S. PATENT DOCUMENTS

| | | |
|---|---|---|
| 2014/0149130 A1 | 5/2014 | Getchius |
| 2014/0149272 A1 | 5/2014 | Hirani et al. |
| 2014/0149436 A1 | 5/2014 | Bahrami et al. |
| 2014/0156484 A1 | 6/2014 | Chan et al. |
| 2014/0283067 A1 | 9/2014 | Call et al. |
| 2014/0310282 A1 | 10/2014 | Sprague et al. |
| 2014/0331119 A1 | 11/2014 | Dixon et al. |
| 2014/0379812 A1 | 12/2014 | Bastide et al. |
| 2015/0067533 A1 | 3/2015 | Volach |
| 2015/0178825 A1 | 6/2015 | Huerta |
| 2015/0235334 A1 | 8/2015 | Wang et al. |
| 2016/0004764 A1 | 1/2016 | Chakerian et al. |
| 2016/0034470 A1 | 2/2016 | Sprague et al. |
| 2016/0048937 A1* | 2/2016 | Mathura ............ G06Q 10/0635 705/30 |
| 2016/0171113 A1 | 6/2016 | Fanous et al. |
| 2016/0180451 A1 | 6/2016 | Visbal et al. |
| 2017/0111059 A1* | 4/2017 | Guilford ............. H03M 7/3086 |
| 2017/0221063 A1* | 8/2017 | Mathura ................ G06Q 50/26 |
| 2018/0322198 A1 | 11/2018 | Elkherj et al. |

FOREIGN PATENT DOCUMENTS

| | | |
|---|---|---|
| EP | 2911078 | 8/2015 |
| EP | 2963577 | 1/2016 |
| EP | 2985729 | 2/2016 |
| EP | 3018879 | 5/2016 |
| EP | 3037991 | 6/2016 |
| EP | 3038046 | 6/2016 |
| EP | 3399443 | 11/2018 |
| GB | 2513247 | 10/2014 |
| WO | WO 2008/011728 | 1/2008 |
| WO | WO 2008/113059 | 9/2008 |
| WO | WO 2013/126281 | 8/2013 |
| WO | WO 2014/138185 | 9/2014 |

OTHER PUBLICATIONS

US 8,725,631 B1, 05/2014, Sprague et al. (withdrawn)
"A Word About Banks and the Laundering of Drug Money," Aug. 18, 2012, http://www.golemxiv.co.uk/2012/08/a-word-about-banks-and-the-laundering-of-drug-money/.
"Money Laundering Risks and E-Gaming: A European Overview and Assessment," 2009, http://www.cf.ac.uk/socsi/resources/Levi_Final_Money_Laundering_Risks_egaming.pdf.
"Potential Money Laundering Warning Signs," snapshot taken 2003, https://web.archive.org/web/20030816090055/http:/finsolinc.com/anti-money%20laundering%20training%20guides.pdf.
"Using Whois Based Geolocation and Google Maps API for Support Cybercrime Investigations," http://wseas.us/e-library/conferences/2013/Dubrovnik/TELECIRC/TELECIRC-32.pdf.
Alfred, Rayner "Summarizing Relational Data Using Semi-Supervised Genetic Algorithm-Based Clustering Techniques", Journal of Computer Science, 2010, vol. 6, No. 7, pp. 775-784.
Bhosale, Safal V., "Holy Grail of Outlier Detection Technique: A Macro Level Take on the State of the Art," International Journal of Computer Science & Information Technology, Aug. 1, 2014, retrieved from http://www.ijcsit.com/docs/Volume5/vol5issue04/ijcsit20140504226.pdf retrieved May 3, 2016.
Golmohammadi et al., "Data Mining Applications for Fraud Detection in Securities Market," Intelligence and Security Informatics Conference (EISIC), 2012 European, IEEE, Aug. 22, 2012, pp. 107-114.
Gu et al., "BotMiner: Clustering Analysis of Network Traffice for Protocol-and-Structure-Independent Botnet Detection," USENIX Security Symposium, 2008, 17 pages.
Hodge et al., "A Survey of Outlier Detection Methodologies," Artificial Intelligence Review, vol. 22, No. 2, Oct. 1, 2004.
Keylines.com, "An Introduction to KeyLines and Network Visualization," Mar. 2014, <http://keylines.com/wp-content/uploads/2014/03/KeyLines-White-Paper.pdf> downloaded May 12, 2014 in 8 pages.
Keylines.com, "KeyLines Datasheet," Mar. 2014, <http://keylines.com/wp-content/uploads/2014/03/KeyLines-datasheet.pdf> downloaded May 12, 2014 in 2 pages.
Keylines.com, "Visualizing Threats: Improved Cyber Security Through Network Visualization," Apr. 2014, <http://keylines.com/wp-content/uploads/2014/04/Visualizing-Threats1.pdf> downloaded May 12, 2014 in 10 pages.
Li et al., "Identifying the Signs of Fraudulent Accounts using Data Mining Techniques," Computers in Human Behavior, vol. 28, No. 3, Jan. 16, 2012.
Ngai et al., "The Application of Data Mining Techniques in Financial Fraud Detection: A Classification Frameworok and an Academic Review of Literature," Decision Support Systems, Elsevier Science Publishers, Amsterdam, Netherlands, vol. 50, No. 3, Feb. 1, 2011.
Nolan et al., "Mcarta: A Malicious Code Automated Run-Time Analysis Framework," Homeland Security (HST) 2012 IEEE Conference on Technologies for, Nov. 13, 2012, pp. 13-17.
Notice of Allowance for U.S. Appl. No. 14/139,628 dated Jun. 24, 2015.
Notice of Allowance for U.S. Appl. No. 14/139,640 dated Jun. 17, 2015.
Notice of Allowance for U.S. Appl. No. 14/139,713 dated Jun. 12, 2015.
Notice of Allowance for U.S. Appl. No. 14/264,445 dated May 14, 2015.
Notice of Allowance for U.S. Appl. No. 14/278,963 dated Sep. 2, 2015.
Notice of Allowance for U.S. Appl. No. 14/323,935 dated Oct. 1, 2015.
Notice of Allowance for U.S. Appl. No. 14/473,552 dated Jul. 24, 2015.
Notice of Allowance for U.S. Appl. No. 14/473,860 dated Jan. 5, 2015.
Notice of Allowance for U.S. Appl. No. 14/486,991 dated May 1, 2015.
Notice of Allowance for U.S. Appl. No. 14/579,752 dated Apr. 4, 2016.
Notice of Allowance for U.S. Appl. No. 14/616,080 dated Apr. 2, 2015.
Notice of Allowance for U.S. Appl. No. 15/584,423 dated Oct. 31, 2018.
Offical Communication for U.S. Appl. No. 14/473,552 dated Feb. 24, 2015.
Official Communication for European Patent Application No. 14159535.5 dated May 22, 2014.
Official Communication for European Patent Application No. 15155845.9 dated Oct. 6, 2015.
Official Communication for European Patent Application No. 15156004.2 dated Aug. 24, 2015.
Official Communication for European Patent Application No. 15175171.8 dated Nov. 25, 2015.
Official Communication for European Patent Application No. 15180515.7 dated Dec. 14, 2015.
Official Communication for European Patent Application No. 15193287.8 dated Apr. 1, 2016.
Official Communication for European Patent Application No. 15201727.3 dated May 23, 2016.
Official Communication for European Patent Application No. 15202090.5 dated May 13, 2016.
Official Communication for European Patent Application No. 18170321.6 dated Jul. 9, 2018.
Official Communication for Great Britain Application No. 1404457.2 dated Aug. 14, 2014.
Official Communication for Netherlands Patent Application No. 2012433 dated Mar. 11, 2016.
Official Communication for U.S. Appl. No. 14/251,485 dated Oct. 1, 2015.
Official Communication for U.S. Appl. No. 14/264,445 dated Apr. 17, 2015.
Official Communication for U.S. Appl. No. 14/486,991 dated Mar. 10, 2015.

(56) References Cited

OTHER PUBLICATIONS

Official Communication for U.S. Appl. No. 14/518,757 dated Apr. 2, 2015.
Official Communication for U.S. Appl. No. 14/518,757 dated Jul. 20, 2015.
Official Communication for U.S. Appl. No. 14/518,757 dated Dec. 1, 2015.
Official Communication for U.S. Appl. No. 14/579,752 dated May 26, 2015.
Official Communication for U.S. Appl. No. 14/579,752 dated Aug. 19, 2015.
Official Communication for U.S. Appl. No. 14/579,752 dated Dec. 9, 2015.
Official Communication for U.S. Appl. No. 14/581,920 dated Mar. 1, 2016.
Official Communication for U.S. Appl. No. 14/581,920 dated May 3, 2016.
Official Communication for U.S. Appl. No. 14/581,920 dated Jun. 13, 2016.
Official Communication for U.S. Appl. No. 14/639,606 dated May 18, 2015.
Official Communication for U.S. Appl. No. 14/639,606 dated Jul. 24, 2015.
Official Communication for U.S. Appl. No. 14/639,606 dated Oct. 16, 2015.
Official Communication for U.S. Appl. No. 14/639,606 dated Apr. 5, 2016.
Official Communication for U.S. Appl. No. 14/698,432 dated Jun. 3, 2016.
Official Communication for U.S. Appl. No. 14/726,353 dated Sep. 10, 2015.
Official Communication for U.S. Appl. No. 14/726,353 dated Mar. 1, 2016.
Official Communication for U.S. Appl. No. 14/857,071 dated Mar. 2, 2016.
Official Communication for U.S. Appl. No. 15/072,174 dated Jun. 1, 2016.
Official Communication for U.S. Appl. No. 15/584,423 dated Aug. 2, 2017.
Official Communication for U.S. Appl. No. 15/584,423 dated Apr. 19, 2018.
Perdisci et al., "Behavioral Clustering of HTTP-Based Malware and Signature Generation Using Malicious Network Traces," USENIX, Mar. 18, 2010, pp. 1-14.
Quartert FS "Managing Business Performance and Detecting Outliers in Financial Services," Oct. 16, 2014, retrieved from https://quartetfs.com/images/pdf/white-papers/Quartet_FS_White_Paper_-_ActivePivot_Sentinel.pdf retrieved on May 3, 2016.
Quartert FS "Resource Center," Oct. 16, 2014, retrieved from https://web.archive.org/web/20141016044306/http://quartetfs.com/resource-center/white-papers retrieved May 3, 2016.
Restriction Requirement for U.S. Appl. No. 14/857,071 dated Dec. 11, 2015.
Shah, Chintan, "Periodic Connections to Control Server Offer New Way to Detect Botnets," Oct. 24, 2013 in 6 pages, <http://www.blogs.mcafee.com/mcafee-labs/periodic-links-to-control-server-offer-new-way-to-detect-botnets>.
Shi et al., "A Scalable Implementation of Malware Detection Based on Network Connection Behaviors," 2013 International Conference on Cyber-Enabled Distributed Computing Knowledge Discovery, IEEE, Oct. 10, 2013, pp. 59-66.
Wiggerts, T.A., "Using Clustering Algorithms in Legacy Systems Remodularization," Reverse Engineering, Proceedings of the Fourth Working Conference, Netherlands, Oct. 6-8, 1997, IEEE Computer Soc., pp. 33-43.

\* cited by examiner

AUTOMATED ASSISTANCE FOR GENERATING RELEVANT AND VALUABLE SEARCH RESULTS FOR AN ENTITY OF INTEREST

BACKGROUND

Searches, such as internet searches, are typically conducted to identify information related to an entity that is not yet known to the searcher so as to provide the searcher enriched knowledge about the entity. The search results may include one or more hits that are "obvious hits". For example, when the entity is a person of interest and a hit includes the fully spelled name and correct social security number and birth date for the person, such a hit can be considered an obvious hit.

Obvious hits may not be sufficient in all situations, however, as the number of the obvious hits from a search may be limited, and perhaps all the obvious hits collectively may not reveal all desired information about the entity. This is particularly true when the entity, such as a person, intentionally hides its identity by using false or incomplete identification information. In such a case, a comprehensive search strategy is needed, which requires the intervention by a human, such as analyst. In particular, the analyst may screen the raw search results in order to identify potential matches. However, analysts frequently do not possess advanced search techniques or are not readily able to use search tools that enable them to conduct a comprehensive search.

SUMMARY

Under some approaches, a system with search functionality may be used by analysts to discover, filter and aggregate data on an entity of interest. An analyst may search one or more data sources to discover information about the entity of interest and manually collate and aggregate the discovered data. Such techniques may require significant experience and skill on the part of the analyst to search one or more data sources and draw connections between the discovered information. Further, for entities with dispersed information, a comprehensive search may require a wide variety of search queries applied to the data sources. In such a scenario, even an experienced analyst may struggle in designing the search and analyze the information discovered from the search. These and other drawbacks exist with conventional analyst driven data aggregation techniques.

A claimed solution rooted in computer technology overcomes problems specifically arising in the realm of computer technology. In various implementations, a computing system is configured to provide methods that may search one or more data sources for information on an entity of interest. The system may facilitate the filtering and structuring of the discovered information either automatically or with the assistance of an analyst. The system may further leverage the discovered information to automatically generate and conduct additional searches of the multiple data sources to generate aggregated data on the subject of interest.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

Figure 1:
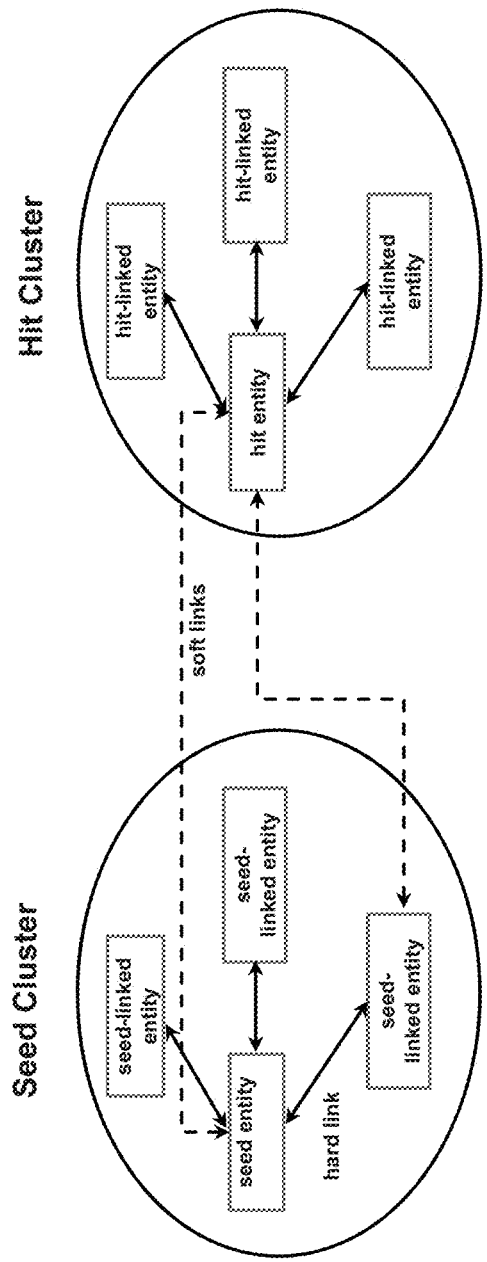
FIG. 1 illustrates the compositions of a seed cluster used for searches, and hit clusters returned from the searches. The hard links and soft links between entities within or between the clusters are also indicated.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Useful information from a data source that may be related to an entity sometimes is associated with incomplete identifying information or is not directly linked to the entity. It is also common that the information is scattered in different data entries in data source or in different sources. For instance, a series of financial transactions originated from a sender, through one or more intermediate receivers and senders and banks, may be used to effect transfer of an amount of money from the sender to an ultimate receiver. Each transaction may be recorded in a different data source, and the individuals associated with the transaction may use incomplete or false identifying information. This would present a great challenge for uncovering the entire transaction.

A claimed solution rooted in computer technology overcomes problems specifically arising in the realm of computer technology. In various implementations, a method entails receiving a search query related to an entity, such as an individual or institution. Optionally, a pre-search can be conducted to identify useful information related to the entity in order to construct effective search queries. For instance, the pre-search can be conducted with limited information, such as a name and date of birth of a person. Such a simple search may reveal additional properties of the entity, such as social security number, city of birth, address, images, social networking accounts, phone number, and email addresses.

The entity of interest is also referred to as a "seed entity" or simply a "seed". Each of these properties associated with the seed entities can be referred to as an "entity property." As used herein, the term "entity" refers to any real world entity that has attributes useful for identifying the entity. An entity can be a person or an organization, and can also be an account, a place, or an event. Attributes for the entity include, for example, names, identification number, characteristics and address, without limitation.

During the optional pre-search, entities related with the seed entity may be uncovered. Such other entities are hereinafter referred to as "related entities" or "seed-linked entities". The relationship between the seed entity and a seed-linked entity is hereinafter referred to as a "link". Known links or validated links are referred to as "hard links," and potential links uncovered during a search (not yet validated) are referred to as "soft links."

A seed entity may be linked to one or more seed-linked entities. For instance, for a person as a seed entity, a seed-linked entity can be a financial institution where the person has an account or has conducted transactions. For the same person, another seed-linked entity may be a second person that co-owns a shop with the seed person.

In some embodiments, one or more properties of a seed entity are used to generate a search query. In some embodiments, a search query includes at least a property of one or more seed-linked entities. In some embodiments, a set of different search queries are generated. Each of them may include a property of one of the entities, but the set collectively represents a combination of different properties of different entities. As illustrated in FIG. 1, the collection of a seed entity and one more hard-linked seed-linked entities constitutes a "seed cluster."

The term "database" or "data source" may refer to any data structure for storing and/or organizing data, including, but not limited to, relational databases (Oracle database, mySQL database, Cassandra database, etc.), spreadsheets, XML, files, and text file, among others. In some embodiments, a database schema of a database system is its structure described in a formal language supported by the database management system.

The term "data compression," as commonly used in signal processing, involves encoding information using fewer bits than the original representation. Compression can be either lossy or lossless. Lossless compression reduces bits by identifying and eliminating statistical redundancy. No information is lost in lossless compression.

The term "Huffman coding" refers to the use of a particular type of optimal prefix code used for lossless data compression. The output from Huffman coding can be viewed as a variable-length code table for encoding a source symbol (such as a character in a file). The algorithm derives this table from the estimated probability or frequency of occurrence (weight) for each possible value of the source symbol. As in other entropy encoding methods, more common symbols are generally represented using fewer bits than less common symbols. Huffman's method can be efficiently implemented, finding a code in time linear to the number of input weights if these weights are sorted.

Compilation and Extension of Search Queries

A plurality of search queries built upon the properties of entities in a seed cluster can be used for one or more rounds of comprehensive searches. As explained above, the properties of the seed entity and seed-linked entities can be obtained from an optional pre-search, or alternatively retrieved from a pre-existing data source or provided by a user.

The search queries, in some embodiments, not only include ones with different properties of the seed entity, but also those built upon properties of various seed-linked entities. Given that each of the entities can have multiple properties, and that there may be multiple seed-linked entities (see, e.g., illustration in FIG. 1), a comprehensive set of search queries can be compiled. In some embodiments, at least one of the search queries includes at least one property of the seed entity and another search query includes one property of a seed-linked entity. In some embodiments, at least two of the search queries each includes a different property of the seed entity and another search query includes at least a property of a seed-linked entity. In some embodiments, at least one property of the seed entity and properties of at least two seed-linked entities are included in different search queries. In some embodiments, the plurality of search queries includes search queries representing different combinations of properties of the seed entity and different combinations of the linked seed entity/seed-linked entity pairs.

Furthermore, in addition to the exact phrases (e.g., names and address) of the properties, different variations of the phrases can also be included. Variations of a name, for instance, can include a name's initial letter, a nickname, or a different spelling of the name. Variations can also be commonly misspelled words, for example.

Therefore, a large number of search queries can be generated. In some embodiments, these search queries can be prioritized, optimized, or consolidated. One example approach for optimization is to check and remove some redundancy, or in other words, to select a smaller, diverse and yet representative subset of the search queries. In another example, the search queries are ranked, e.g., according to an estimated probability of the search queries returning meaningful or desired hits. The top-ranked search queries can then be selected to form a smaller set of search queries, or alternatively certain lower-ranked search queries are eliminated. More details of search optimization and prioritization are provided below.

In some embodiments, after an initial round of searches is conducted with the search queries, one or more rounds of additional searches can be run. The additional searches, in some embodiments, can use search queries that are optimized or updated which takes advantage of the initial search results. For instance, in the first round of search, the search queries may include ones that include properties of the entity and a related entity (e.g., Joe Smith and Bank of the World). The search results then suggest a relationship between Joe Smith and Jane Johnson through transactions carried out at Bank of the World. Soft links are accordingly created between Joe Smith and Jane Johnson and between Bank of the World and Jane Johnson.

In addition, a validated data source indicates that Jane Johnson is hard-linked to Bank of the Universe. Accordingly, either or both of Jane Johnson and Bank of the Universe can be added to the search queries during the next round of searches. As provided earlier, the extended search queries generated with this additional information can include different permutations of the information and the variants thereof.

Search Result Cleanup, Tagging, Aggregation and Ranking

Some results returned from the searches may be well-defined entries in a database, such as a record of a financial transaction. The record may include an entry for each party to the transaction, the bank, the account numbers, and the amount of the transaction.

When a search is carried out against an unstructured data source, such as a collection of documents, the search results are less structured. For example, a search result (or "hit") may be a report that includes the names of entities and bank account number in plain text with no marking or identification. For an unstructured search result, potentially relevant words, phrases, or other strings can be tagged or marked to facilitate further analysis. Automated tagging can be done with methods including the use of natural language processing analysis and predefined regular expressions.

It is also possible that some of the information in a document is not formatted optimally for processing. For instance, phone numbers may include various hyphens and brackets, first and last names may be arranged differently, and addresses can come in different formats. Accordingly, an optional cleanup step can be carried out, such as by adopting a standardized format for each type of data of interest. For instance, for all strings that are recognized as U.S. phone numbers, they can be reformatted as (XXX)-XXX-XXXX if not already in this format. With such cleanup and tagging, each search result can be represented as a potentially matched entity with one or more properties or one or more related entities.

Sometimes, two or more search results are likely related as determined by, for instance, their source or common use of identifying information or properties of certain entities. In such a scenario, these search results can be aggregated to represent a single hit. With or without aggregation, a search result can be represented as a "hit cluster" (FIG. 1), which includes properties of a hit entity, and properties of one or more entities believed to be linked to the hit entity (and thus referred to as "hit-linked entities").

One of the advantages of one embodiment the present technology is the ability to provide to an analyst simplified, relevant and useful search results for the analyst to further analyze. This is particularly helpful when the amount of search results generated from the searches is large. In one embodiment, identification of relevant and useful search results is based on provision of a score for each of the hit clusters. Scoring a hit cluster can be done by taking into consideration one or more of the following factors: (a) likelihood of a match between the seed entity and the hit entity or between a seed-linked entity and a hit-linked entity (b) presence of a new entity in the search result not present in the search queries or a difference between the new entity and an entity present in the search queries, and (c) characteristics of the new entity in the search result, e.g., type and time since creation. In other words, factor (a) concerns the "validity" of the hit cluster; factor (b) concerns the "novelty" of the hit cluster, i.e., whether a user is already aware of the information included in the hit cluster, and factor (c) concerns the value of the hit cluster. Each of these factors is discussed in further details below.

For the purpose of illustration, an entity, represented by $e$, is a member of a set of entities, collectively represented by E. Entities can have a set of directed links $L \subseteq E \times E$, and properties P. For an entity $e \in E$, in some embodiments, let $e.p \subseteq P$ denote the properties associated with entity $e$. A cluster around entity e can be referred to as $c(e) = \{v \in E | (e, v) \in L \text{ or } (v, e) \in L\}$. Edge relation L is not necessarily symmetric.

In order to score or rank the hit clusters, in one embodiment, each hit cluster is evaluated for its validity, novelty, and value (three facets) and is given a probability score between [0, 1]. In some embodiments, ranking of the hit clusters is not required, as the probability scores can be directly used to select top results for further consideration and analysis by an analyst.

In some embodiments, it is assumed that each facet is independent, and the probability score of the hit cluster can be obtained as p(valid)*p(valuable)*p(novel). In a preferred embodiment, the scoring of valuable and novel is bundled as they can be more closely related, and thus the probability scoring can be obtained as p(valid)*p(valuable, novel). For each of the three facets discussed below, the score can be calculated by a deterministic function of the seed entity $s \in E$, hit $v$, clusters c(s), c(v), and the queries matching $s \to vQ = \{$ (backend, $prop_{seed}$, $prop_{hit}$, query, c), ... $\}$. In each query $q \in Q$ backend is the data source where the query was run, $prop_{seed} \in s.p$ the seed property used to generate the query, $prop_{hit} \in v.p$ the property of the target object the search hit on, query the string query run, and c the number of search results returned by running query against backend.

I. Validity

For purpose of illustration, a match between an entity e and a hit v is considered valid if it's unlikely to have happened spuriously, or by chance. Two example methods are described here for determining whether a match is non-spurious. One is the "prior": Given the search string and data sources, what is the likelihood an exact match on this string would spuriously happen? The other is based on the "posterior": Given information about the corpus, how many search results are returned? These methods can be used alone, in one embodiment, or the results can be combined, in another embodiment. When the results are combined, in one embodiment, their probability scores can be multiplied, which then requires both high probability scores for a query to be considered high-quality.

In one example, the validity prior is calculated. In this example, a search query and response contains the information backend, $prop_{seed}$, query, with response information $prop_{hit}$, c. In examining the prior, in one embodiment, it is assumed that all the information but $prop_{hit}$, c is given. Based on the property type being searched (e.g., name, social security number, date of birth) and the backend used for the search, the system may be able to estimate whether a search result is relevant. In a simplified embodiment, the backend probability, seed property $prop_{seed}$ probability, and the probability estimate based on the query string are assumed to be independent estimates of the likelihood a match is relevant. One non-limiting way to aggregate these probabilities is with the product: $P_{backend} P_{seed-property} P_{query}$. In some embodiments, it is assumed that $P_{backend}$ and $P_{seed-property}$ are switch parameters (mapping from which—property/backend→float), and only $P_{query}$ needs to be specified.

In the example of using the prior validity assessment, some techniques from information theory can be used. A deterministic compression method can be used to match a seed set of strings U against another V. For simplicity, in some embodiments, assuming $u \in U$ either exactly matches $v \in V$ or doesn't (e.g., partial matches). Assuming these strings were generated by random bits and a deterministic function over these bits, in one embodiment, compression can be obtained by reversing this deterministic function. In some embodiments, for the compressed sets U' and V' compressed with function c: $(U \cup V) \to (U' \cup V')$, the property $u = v \Leftrightarrow c(u) = c(v)$ can be derived from the function c being deterministic.

In some embodiments, if the prior knowledge is encoded as a deterministic compression function, and the size of set V is given to match against (a parameter to tune), the system can calculate the probability of a spurious match using the simplified model of pure-random bitstrings.

For search queries that include names of an entity, some embodiments may determine how common the names are. A match of a rare name can be considered as more reliable than a match of a common name. Therefore, in one embodiment, a corpus of name frequencies can be obtained from the U.S. Census Bureau or other sources.

The validity posterior is discussed next as another example method for assessing the validity of a match. In accordance with one embodiment of the disclosure, after a search is run, the number of hits returned becomes known. This number can then be used to calculate a probability that the returned result is spurious.

In one embodiment, the probability calculated by simplifying that all search results returned are actually-related matches, or all are spurious (resulting from random unrelated text matching). Similar to calculation of probability prior, in one embodiment, the calculation of probability posterior models the query and data sources as the output of a deterministic process run on a smaller sequence of random bits.

II. Novelty

As described above, a search query may include a seed entity, a related entity that links to the entity through a known or validated link (a hard link), optionally soft links (e.g., links generated through searches), and potentially more hard links. A match between a seed cluster and a hit cluster is considered novel, in some embodiments, if the hit cluster contains an entity, a property, an entity-linked entity, or a link that isn't similar to any of the seed, its properties, its related entities or links. Let $f: (P \cup E) \times (P \cup E) \to [0,1]$ be the similarity function defined over properties and entities. Let M be the set of entities in the match cluster, and S the set of entities/properties in the seed object and seed-links. Then, in some embodiments, the novelty score can be obtained as:

$$\text{novelty}(M,S) = 1 - \min_{m \in M}\{\max_{s \in S} f(s,m)\}.$$

III. Value

The value of a potentially matched search result can be determined, in one embodiment, by the type of result. For instance, in fraud-detection, a prior note from an analyst of likely fraud is a stronger indicator than an unsuspicious money transfer. For a member of the hit cluster, the probability of value is given by $\text{value}_{v.type}$ for any $y \in c(v)$ in the hit cluster.

The novelty and value of a hit cluster can be considered together, in some embodiments. With respect to a hit cluster, in some embodiments, it is preferred that at least one member of the cluster is both novel and valuable. If a hit cluster contains one element that's novel but not valuable, and another element that's valuable but not novel, the cluster as a whole is likely not interesting to a user.

In one embodiment, the value and novelty collectively are defined as:

$$\max_{y \in c(m)}\{\min_{x \in c(s) \cup s,p}(\text{novel}(x,y)^\delta)\text{value}_{y.type}\}$$

which means "the value+ novelty of the most interesting element of the match cluster". The exponent parameter of novelty may balance the two scores.

IV. Combined Relevance Function

In some embodiments, it is considered that a match of a seed cluster to a hit cluster is relevant if the match is valid, novel, and valuable, as illustrated below:

$$P(\text{relevant}) = P(\text{valid})P(\text{novel,valuable})$$

In one embodiment, these probabilities can be replaced with expressions from above to obtain the following:

$$P(\text{relevant}) = \left(1 - \prod_{q \in Q}(1 - p(q))\right)\max_{y \in c(m)}\{\min_{x \in c(s) \cup s,p}(\text{novel}(x, y)^\delta)\text{value}_{y.type}\}$$

where $$p(q) = P_{backend}P_{seed-property}P_{hit-property}\gamma^{1/2^k}\frac{1}{1+\alpha\beta^c}$$

and $$k = \left(\sum_{t=t_1 \cdots t_k} \min\left(\log_2 \frac{1}{P_{name}(t)}, (\log_2 26)len(t)\right)\right) + 5(l-1)$$

for names, and the custom compression calculations detailed above for entity properties such as social security number, or date of birth.

In this example function, all parts are calculable from the seed, the search result, and search properties except $\forall \text{backends}$, $p_{backend}$, $\forall \text{properties}$, $p_{property}$, $\alpha$, $\beta$, $\gamma$, $\delta$, $\forall \text{objecttype}$, $v_{y.type}$, and the function "novel". In one embodiment, the function "novel" may return 1 if for two objects with the same id or otherwise calculate the Jaccard index over alphanumeric tokenized strings. All other properties, however, are numbers in certain embodiments.

IV. Search Query and Pre-Hit Cluster Prioritization

There are two main potential bottlenecks of the above approach: the large number of parallel searches conducted (which could potentially overwhelm the backend), and the large number of links loaded off all entities of the search results.

One example method of reducing the system burden is to prioritize the search queries and select a preferred subset of queries to run. The cutoff in max-number-search-queries can be based on system constraints. In some embodiments, it is considered that a higher-scoring-query is more valuable to run than any number of low-scoring queries. In some embodiments, a greedy algorithm is used:

$$p_{estimated}(q) = P_{backend}P_{seed-property}P_{hit-property}\gamma^{1/2^k}.$$

This greedy algorithm selects the highest-scoring query, then the next highest, and so forth until the system-determined cap on number of queries is maxed out. In some embodiments, a dissimilarity constraint is imposed, such that diverse searches are selected. Assuming for each query pair $q_1$, $q_2$, there is a query-similarity-function $f(q_1,q_2) \in \{0, 1\}$, then the greedy algorithm changes slightly, in some embodiments, to:

given Q//full set of queries
Q*=∅//set of queries to execute
while |Q*|<max–queries and |Q–Q*|>0

$$q = \text{argmax}_{q \in Q}\{P_{estimated}(q)*(1-\max(f(q,q')|q' \in Q^*))\}.$$

A first example choice of the function $f$ that works well is $f(q_1,q_2)=1(q_1 \cdot \text{seedprop}=q_2 \cdot \text{seedprop})$, guaranteeing that one seed property type doesn't dominate the search.

With respect to the second potential bottleneck, in some embodiments, before loading links off the hit cluster, the matches can be prioritized and the matches with low priority scores are removed. A natural prioritization is the relevance function defined above. The relevance functional form is thus identical to above:

$$P(\text{relevant}) = \left(1 - \prod_{q \in Q}(1 - p(q))\right)\text{novel}(s, v)^\delta \text{value}_{v.type}$$

except that novelty/value are calculated only over the match itself, since the hit-cluster has not been loaded.

Automated Assistance

The search techniques described here can be automated with no or minimum human intervention. Therefore, after taking an initial input or command from a user, the system can readily present a prioritized, optimized, and aggregated set of search results to a user for further analysis. In some embodiment, the user command is provided on a graphic user interface, and so is the presentation of the search results.

Figure 2:
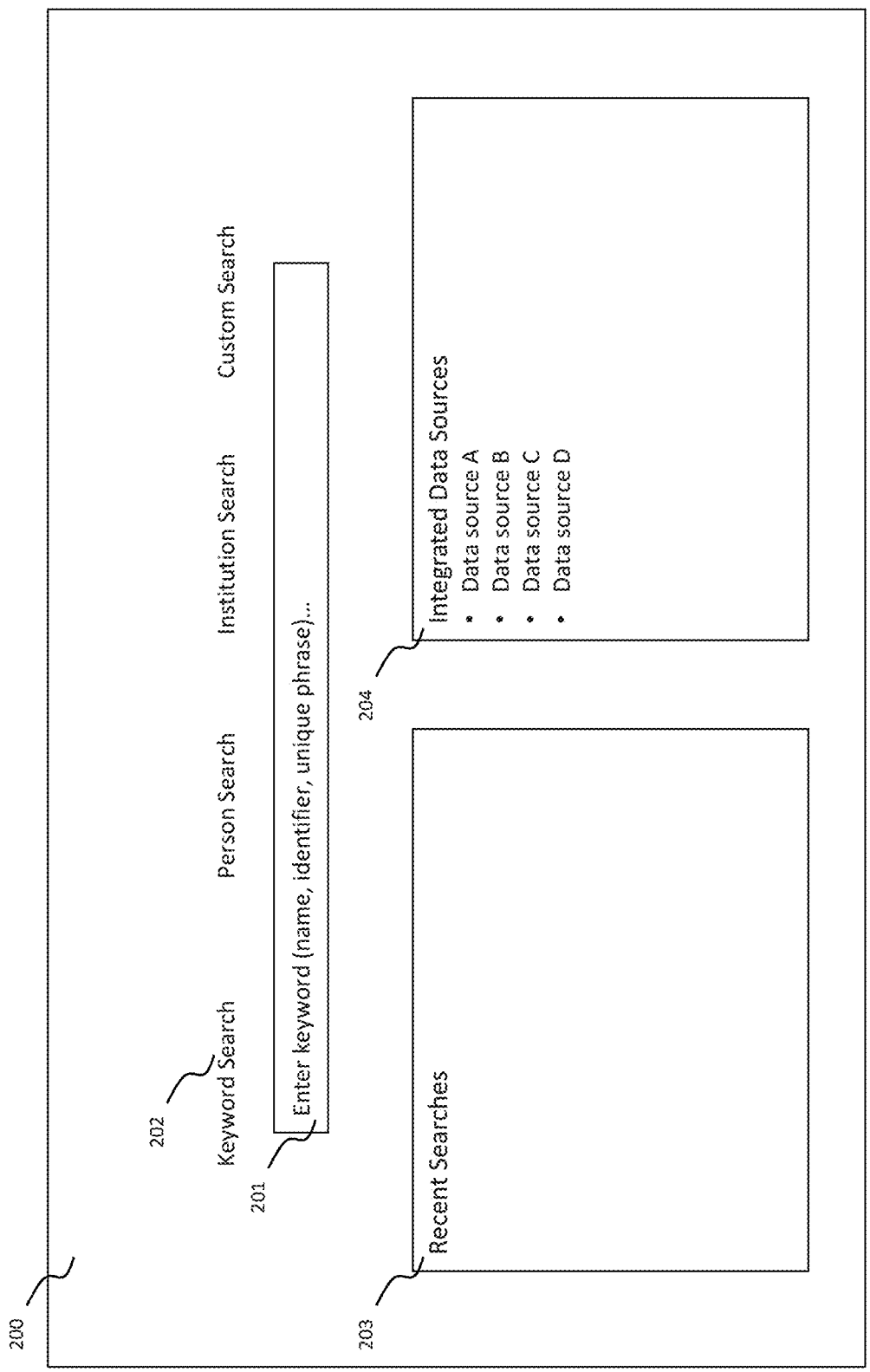
FIG. 2-4 illustrate graphic user interfaces to assist a user to conduct searches and explore search results. The user interfaces can also allow a user to receive alerts of newly obtained search results.

FIG. 2 illustrates a graphic interface 200 that allows a user to conduct a simple search for an entity of interest. Form 201 is configured to receive a search keyword from the user, and the menu bar 202 allows the user to select search preferences. For example, as illustrated in FIG. 2, the search preference can be for any keyword, for a person, for an institution, or can be customized. Below the search form, a panel 203 on the left shows a list of recent searches for the user's convenience. A panel 204 shows data sources available for the search. It is noted that one or more of the data sources can be remote such that the searches will be also done remotely, and one or more of the data sources may be generated or stored locally.

Figure 3:
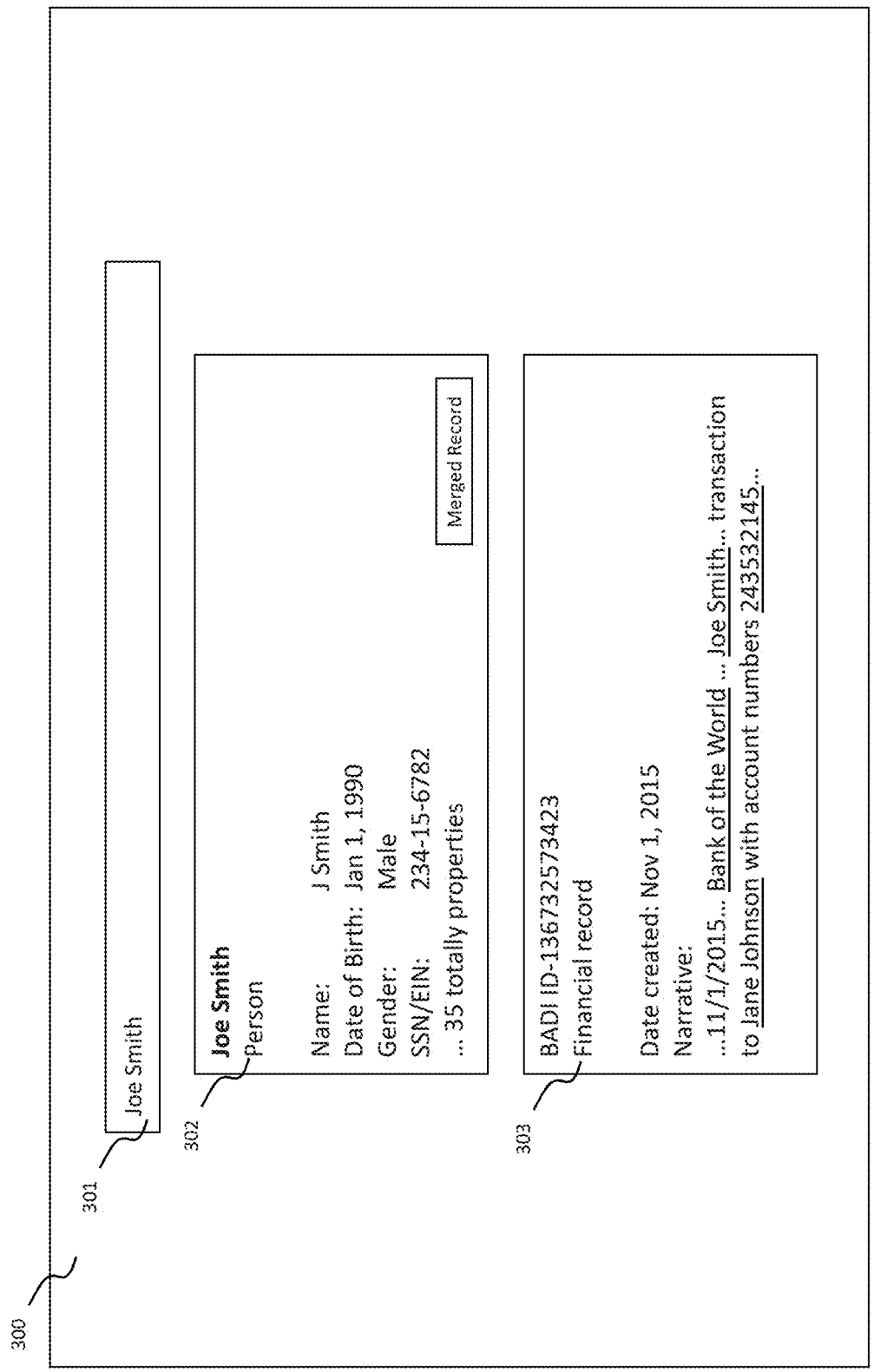

After a user enters a simple search term, FIG. 3 illustrates a portion of results returned to the user. On the interface 300, which can be on the same terminal as seen for interface 200 in FIG. 2, field 301 indicates that the search was done with the keyword "Joe Smith." The first box 302 below is titled "Joe Smith" which is indicated as a person. On the bottom right of the box, an indicator "Merged Record" indicates that this record is a pre-compiled and pre-curated record for this person. Accordingly, a list of properties is provided to the person, some of which are shown. Properties for a person may be name (and name variants), date of birth, SSN, and without limitation.

By contrast, the information displayed in box 303 is less organized. It shows a record ID and type, and some information (e.g., date of creation and narrative) relevant to the record or the search query. Some words and phrases are marked (by underlying) in box 303. As explained above in a different context, such marking (also referred to as tagging) is helpful for user analysis.

Figure 4:
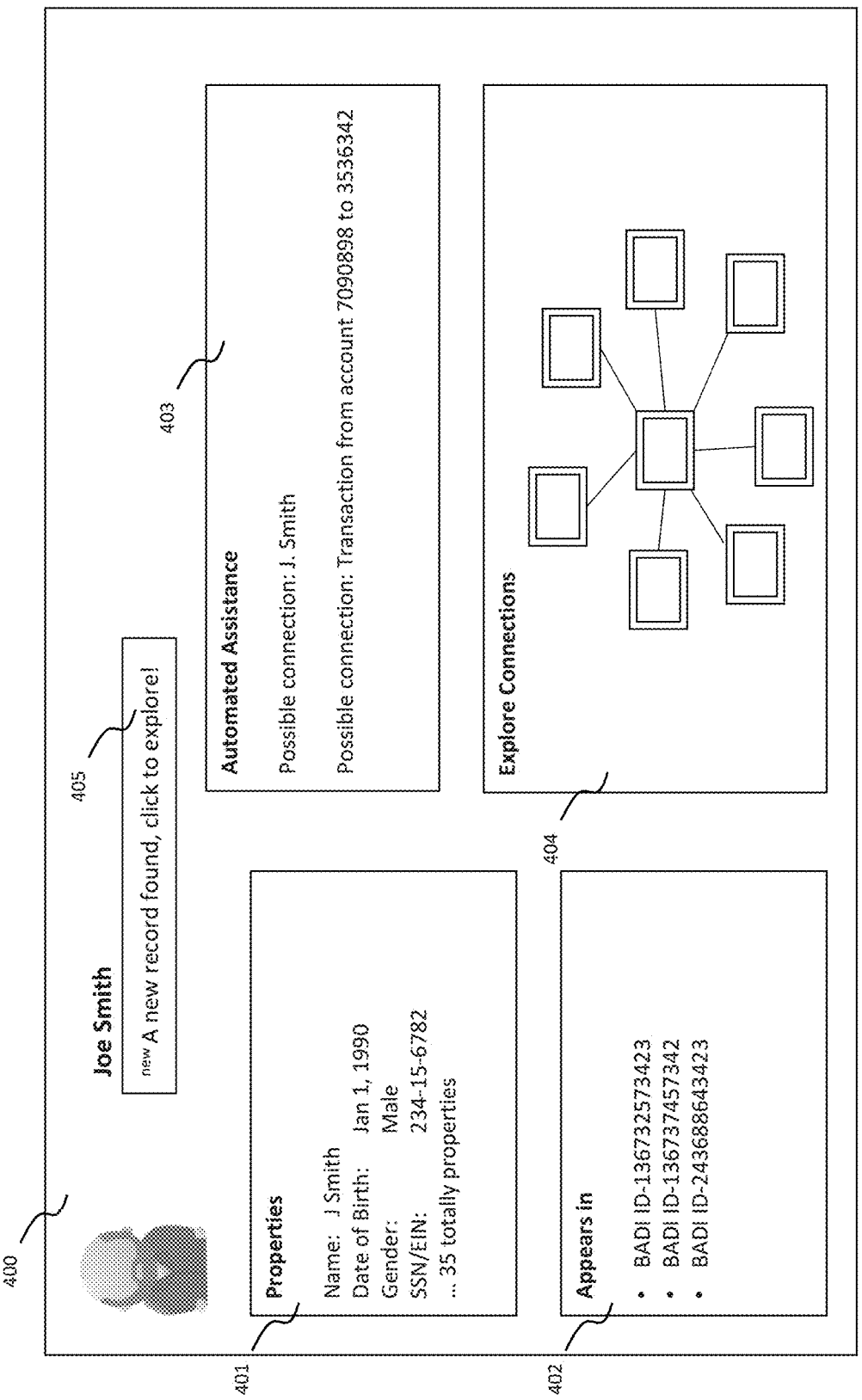

Box 302 presents a collection of curated, aggregated or validated information for the person Joe Smith. When the user clicks on this box, the user is directed to a new interface 400 in FIG. 4. In addition to the properties in box 401 which are already shown in FIG. 3, FIG. 4 also includes a box listing data records that are available from different data sources. Such records can be understood as "obvious hits" probably because the entities identified in these records may have perfect matches with multiple properties of Joe Smith.

In some embodiments, the box 403, titled "Automated Assistance," presents a listing of records that are speculated by the system as potentially relevant to Joe Smith. The method and procedure for the identification of these records are described in details in the sections above, including search query generation, compilation and prioritization, and search result filtering and ranking. In some embodiments, when the system generates search queries in an automated fashion, the system takes one or more properties of the seed entity (e.g., Joe Smith) as well as properties of seed-linked properties, all of which can be already present in this merged record or can be obtained by automated searches.

An important part of the search queries is the links between the seed entity and related other entities. Such links are graphically illustrated in box 404, which allows a user to dig in further details for each link or entity or to tune the search queries if desired. For instance, in box 404, the entity in the center is the seed entity Joe Smith. The other entities that are linked to the seed entity include, without limitation, persons, bank accounts, phones, email addresses, cases, documents, financial organizations, and locations.

In addition to providing a graphic interface that enables a non-technical user/analyst to explore and analyze search results, the system can also be configured to generate alerts based on searches conducted on the background. When a new search result is identified, panel 405 shows an alert message to the user. Alternatively, an alert email can be sent to a user that has shown interest in the seed entity (and an interest to receive such alerts).

Computational Methods and Modules

Figure 5:
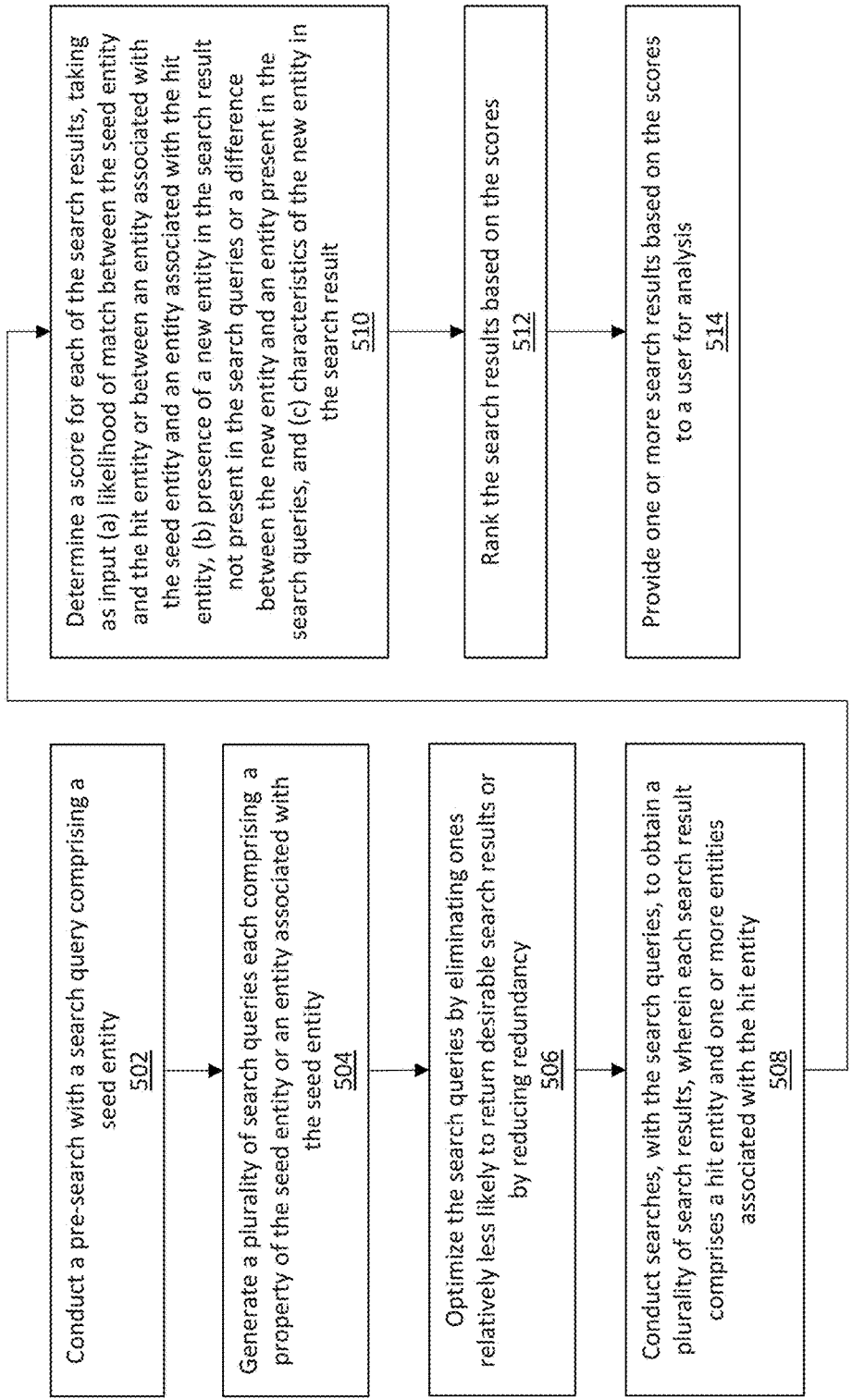
FIG. 5 illustrates a flowchart of an example method for identifying relevant information for an entity.

In accordance with certain embodiments of the present disclosure, FIG. 5 is provided to illustrate a flowchart of an example method 500 for identifying information relating to an entity for analysis. The method 500 may be implemented in various environments including, for example, the system as described herein. The operations of method 500 presented below are intended to be illustrative. Depending on the implementation, the example method 500 may include additional, fewer, or alternative steps performed in various orders or in parallel. The example method 500 may be implemented in various computing systems or devices including one or more processors.

At block 502, a computer system conducts an optional pre-search with a search query comprising a seed entity. At block 504, the system generates a plurality of search queries each comprising a property of a seed entity or an entity associated with the seed entity. In some embodiments, the plurality of search queries can be optimized by eliminating search queries that are relatively less likely to return desirable search results and/or by reducing redundancy (block 506). At block 508, the system conducts searches, with the search queries, to obtain a plurality of search results, wherein each search result comprises a hit entity and one or more entities associated with the hit entity.

At block 510, the system determines a score for each of the search results, taking as input (a) likelihood of match between the seed entity and the hit entity or between an entity associated with the seed entity and an entity associated with the hit entity, (b) presence of a new entity in the search result not present in the search queries or a difference between the new entity and an entity present in the search queries, and (c) characteristics of the new entity in the search result. Optionally, the search results can be ranked based on the scores (block 512), and/or the system provides one or more search results based on the scores to a user for analysis (block 514).

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Also provided is a computer system 600 upon which any of the embodiments described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612, such as a cathode ray tube (CRT) or LCD display (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may retrieve and execute the instructions. The instructions received by main memory 606 may optionally be stored on storage device 610 either before or after execution by processor 604.

The computer system 600 also includes a communication interface 618 coupled to bus 602. Communication interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN (or WAN component to communicated with a WAN). Wireless links may also be implemented. In any such implementation, communication interface 618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network and the communication interface 618.

The received code may be executed by processor 604 as it is received, and/or stored in storage device 610, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

The invention claimed is:

1. A system for identifying relevant information for an entity comprising:

one or more processors; and a memory storing instructions that, when executed by the one or more processors, cause the system to:

conduct a pre-search related to a seed entity provided by a user in one or more data sources to obtain one or more entities associated with the seed entity; and generate a plurality of search queries comprising the seed entity and the one or more entities associated with the seed entity based on the pre-search, the generation comprising:

determining a second entity validated to be linked to the seed entity, the second entity and the seed entity forming a seed cluster;

identifying properties associated with the second entity and the seed entity;

generating a search query that is associated with a subset of the identified properties;

determining that the seed entity is associated with a third entity;

in response to the determination that the seed entity is associated with the third entity:

determining a likelihood of a match randomly occurring between:

the seed entity or an entity in the seed cluster; and the third entity; and creating a second search query based on the determined likelihood.

2. The system of claim 1, wherein at least one of the search queries comprises a fourth entity associated with one of the one or more entities associated with the seed entity, wherein the fourth entity is not known to be associated with the seed entity.

3. The system of claim 2, wherein the fourth entity is identified from the pre-search based on a search query that comprises the seed entity.

4. The system of claim 1, wherein the seed entity or the one or more entities associated with the seed entity are represented by their respective properties, wherein the properties are selected from a group comprising name, address, date of birth, social security number, city of birth, image, social networking account, phone number and email address.

5. The system of claim 1, wherein the instructions further cause the system to:

eliminate search queries from the search queries that are less likely to return desired search results.

6. The system of claim 1, wherein the instructions, when executed, further cause the system to:

conduct searches, based on the search queries, in the one or more data sources to obtain a plurality of search results, wherein each of the search results comprises a hit entity and one or more entities associated with the hit entity.

7. The system of claim 6, wherein the instructions, when executed, further cause the system to:

determine a score for each of the search results based on (a) a likelihood of a match between the seed entity and the hit entity or between an entity associated with the seed entity and an entity associated with the hit entity, (b) a presence of a new entity in the search result not present in the search queries or a difference between the new entity and an entity present in the search queries, and (c) a characteristic of the new entity in the search result.

8. The system of claim 7, wherein the seed entity is associated with a person, and the likelihood of the match is determined based on a frequency of use of a name of the person.

9. The system of claim 7, wherein the characteristic of the new entity is compared to a predefined list of characteristics of entities to determine a value of the characteristic.

10. A computer-implemented method comprising:

conducting a pre-search related to a seed entity provided by a user in one or more data sources to obtain one or more entities associated with the seed entity; and generating a plurality of search queries comprising the seed entity and the one or more entities associated with the seed entity based on the pre-search, the generation comprising:

determining a second entity validated to be linked to the seed entity, the second entity and the seed entity forming a seed cluster;

identifying properties associated with the second entity and the seed entity;

generating a search query that is associated with a subset of the identified properties;

determining that the seed entity is associated with a third entity;

in response to the determination that the seed entity is associated with the third entity:

determining a likelihood of a match randomly occurring between:

the seed entity or an entity in the seed cluster; and the third entity; and creating a second search query based on the determined likelihood.

11. The method of claim 10, wherein at least one of the search queries comprises a fourth entity associated with one of the one or more entities associated with the seed entity, wherein the fourth entity is not known to be associated with the seed entity.

12. The method of claim 10, wherein the seed entity or the one or more entities associated with the seed entity are represented by their respective properties, wherein the properties are selected from a group comprising name, address, date of birth, social security number, city of birth, image, social networking account, phone number and email address.

13. The method of claim 10, further comprising:

eliminate search queries from the search queries that are less likely to return desired search results.

14. The method of claim 10, further comprising:

conducting searches, based on the search queries, in the one or more data sources to obtain a plurality of search results, wherein each of the search results comprises a hit entity and one or more entities associated with the hit entity.

15. The method of claim 14, further comprising:

determining a score for each of the search results based on (a) a likelihood of a match between the seed entity and the hit entity or between an entity associated with the seed entity and an entity associated with the hit entity, (b) a presence of a new entity in the search result not present in the search queries or a difference between the new entity and an entity present in the search queries, and (c) a characteristic of the new entity in the search result.

16. The method of claim 15, wherein the seed entity is associated with a person, and the likelihood of the match is determined based on a frequency of use of a name of the person.

17. The method of claim 15, wherein the characteristic of the new entity is compared to a predefined list of characteristics of entities to determine a value of the characteristic.

18. A non-transitory computer readable medium of a computing system comprising instructions that, when executed, cause one or more processors of the computing system to perform:
- conducting a pre-search related to a seed entity provided by a user in one or more data sources to obtain one or more entities associated with the seed entity; and
- generating a plurality of search queries comprising the seed entity and the one or more entities associated with the seed entity based on the pre-search, the generation comprising:
  - determining a second entity validated to be linked to the seed entity, the second entity and the seed entity forming a seed cluster;
  - identifying properties associated with the second entity and the seed entity;
  - generating a search query that is associated with a subset of the identified properties;
  - determining that the seed entity is associated with a third entity;
  - in response to the determination that the seed entity is associated with the third entity:
    - determining a likelihood of a match randomly occurring between:
      - the seed entity or an entity in the seed cluster; and
      - the third entity; and
    - creating a second search query based on the determined likelihood.

* * * * *